US012749883B2

(12) United States Patent
Tomosada

(10) Patent No.: US 12,749,883 B2
(45) Date of Patent: Sep. 29, 2026

(54) ROUTING STRUCTURE

(71) Applicant: YAZAKI CORPORATION, Tokyo (JP)

(72) Inventor: Kosuke Tomosada, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 187 days.

(21) Appl. No.: 18/942,339

(22) Filed: Nov. 8, 2024

(65) Prior Publication Data

US 2025/0158376 A1 May 15, 2025

(30) Foreign Application Priority Data

Nov. 13, 2023 (JP) ................................ 2023-192664

(51) Int. Cl.

| | |
|---|---|
| ***H02G 11/00*** | (2006.01) |
| ***B60J 7/043*** | (2006.01) |
| ***B60J 7/057*** | (2006.01) |
| ***B60R 16/02*** | (2006.01) |
| ***H01B 7/18*** | (2006.01) |

(52) U.S. Cl.

CPC ............ *H02G 11/006* (2013.01); *B60J 7/043* (2013.01); *B60R 16/0215* (2013.01); *H01B 7/185* (2013.01)

(58) Field of Classification Search

CPC ........ H02G 11/00; H02G 11/003; H02G 3/24; H02G 3/26; H02G 3/263; H02G 3/28; B60J 78/02; B60R 16/0215; B60R 16/027

See application file for complete search history.

(56) References Cited

U.S. PATENT DOCUMENTS

| | | | | |
|---|---|---|---|---|
| 10,038,314 B2 * | 7/2018 | Satou | .................. | H02G 3/0462 |
| 2020/0099213 A1 * | 3/2020 | Sato | .................... | B60R 16/0215 |
| 2023/0256922 A1 * | 8/2023 | Kogure | ............... | B60R 16/0215 174/72 A |

FOREIGN PATENT DOCUMENTS

| | | |
|---|---|---|
| JP | 2011-151906 A | 8/2011 |

* cited by examiner

*Primary Examiner* — Amol H Patel

(74) *Attorney, Agent, or Firm* — KENEALY VAIDYA LLP

(57) ABSTRACT

A routing structure includes: a first fixing part; a second fixing part fixed to a slide body; an exterior member having a first end portion and a second end portion; an electric wire; and a biasing member forming a curved portion between the first end portion and the second end portion of the exterior member, in which the biasing member has an arcuate portion forming the curved portion when the slide body is located at an end of a slide range, the arcuate portion is formed to have an arcuate shape with a predetermined radius in a state where no external force acts on the biasing member, and the predetermined radius is greater than half of a distance from the first end portion to the second end portion in a vehicle up-down direction when the slide body is located at the end portion of the slide range.

2 Claims, 10 Drawing Sheets

ROUTING STRUCTURE

CROSS-REFERENCE TO RELATED APPLICATION(S)

The present application claims priority to and incorporates by reference the entire contents of Japanese Patent Application No. 2023-192664 filed in Japan on Nov. 13, 2023.

BACKGROUND OF THE INVENTION

1. Field of the Invention

The present invention relates to a routing structure.

2. Description of the Related Art

Conventionally, there is a power feeding device for a slide body. Japanese Patent Application Laid-open No. 2011-151906 discloses a power feeding device for a slide body including a wire harness routed over a vehicle body and a slide body that is slidably provided on the vehicle body and opens and closes an opening formed in the vehicle body.

It has been studied by the inventor of the present application to arrange a biasing member having rigidity inside an exterior member when the exterior member is included in a routing structure between a vehicle body and a slide body. Here, from the viewpoint of securing durability against bending of the biasing member, it is preferable to reduce the rigidity of the biasing member. On the other hand, when a curved portion is formed in the exterior member and the biasing member, if the rigidity of the biasing member is small, a tapered shape is easily generated in the curved portion. The tapered shape of the curved portion causes a decrease in bending radius of an electric wire.

SUMMARY OF THE INVENTION

An object of the present invention is to provide a routing structure capable of suppressing a biasing member from having a tapered shape.

In order to achieve the above mentioned object, a routing structure according to one aspect of the present invention includes a first fixing part fixed to a vehicle body of a vehicle; a second fixing part fixed to a slide body that moves along a vehicle front-rear direction with respect to an opening provided in a roof of the vehicle body; an exterior member having a first end portion held by the first fixing part and a second end portion held by the second fixing part; an electric wire inserted through the exterior member; and a rod-like or plate-like biasing member inserted through the exterior member and forming a curved portion curved in the vehicle front-rear direction between the first end portion and the second end portion of the exterior member, wherein the biasing member has an arcuate portion that is a portion forming the curved portion when the slide body is located at an end of a slide range, the arcuate portion is formed to have an arcuate shape with a predetermined radius in a state where no external force acts on the biasing member, and the predetermined radius is greater than half of a distance from the first end portion to the second end portion in a vehicle up-down direction when the slide body is located at the end portion of the slide range.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a routing structure according to an embodiment of the present invention will be described in detail with reference to the drawings. Note that the present invention is not limited by the present embodiment. In addition, the components in the following embodiment include those that can be easily imagined by those skilled in the art or those that are substantially the same.

Embodiment

Figure 1:
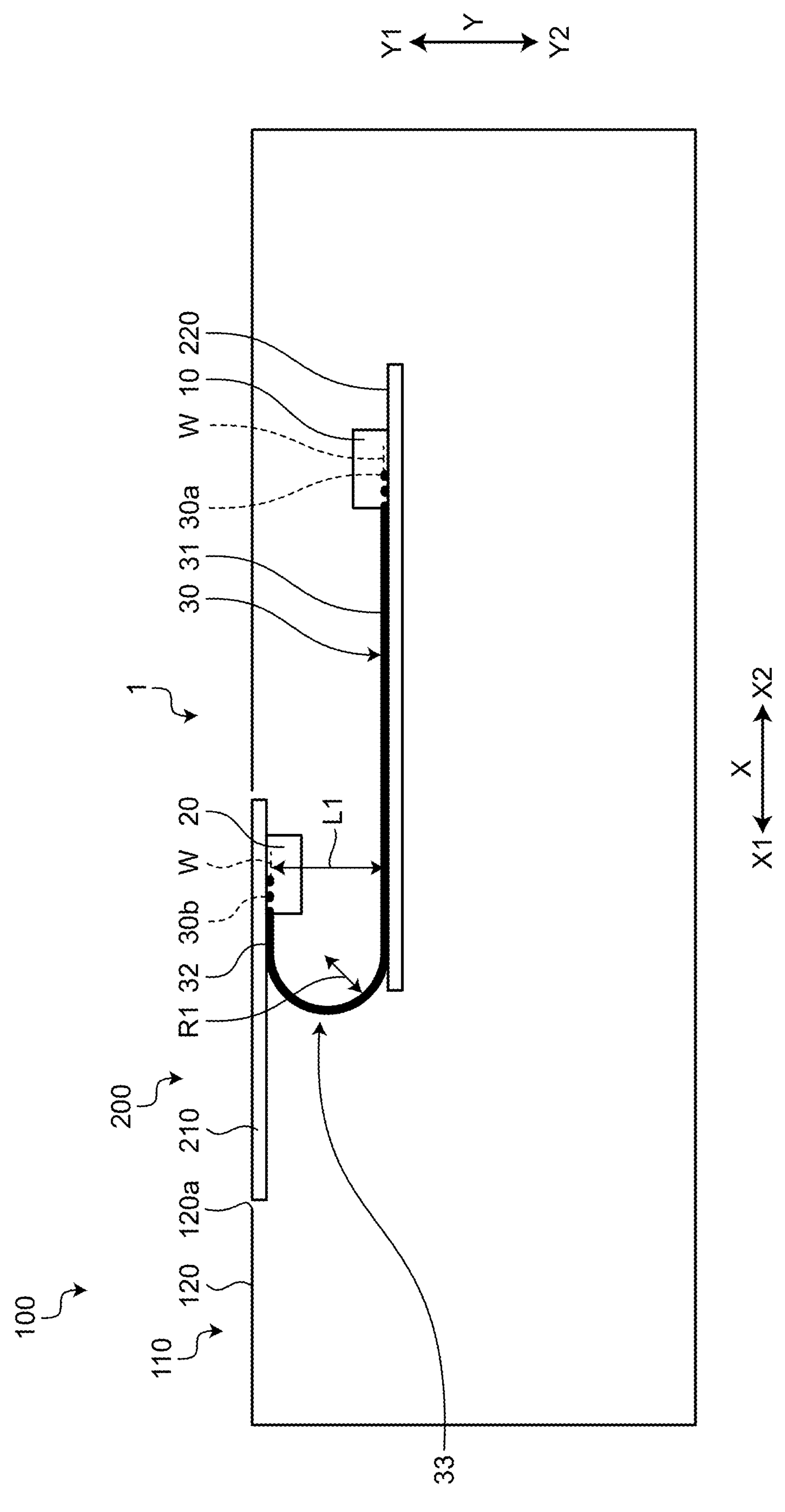
FIG. 1 is a side view of a routing structure according to an embodiment.
Figure 2:
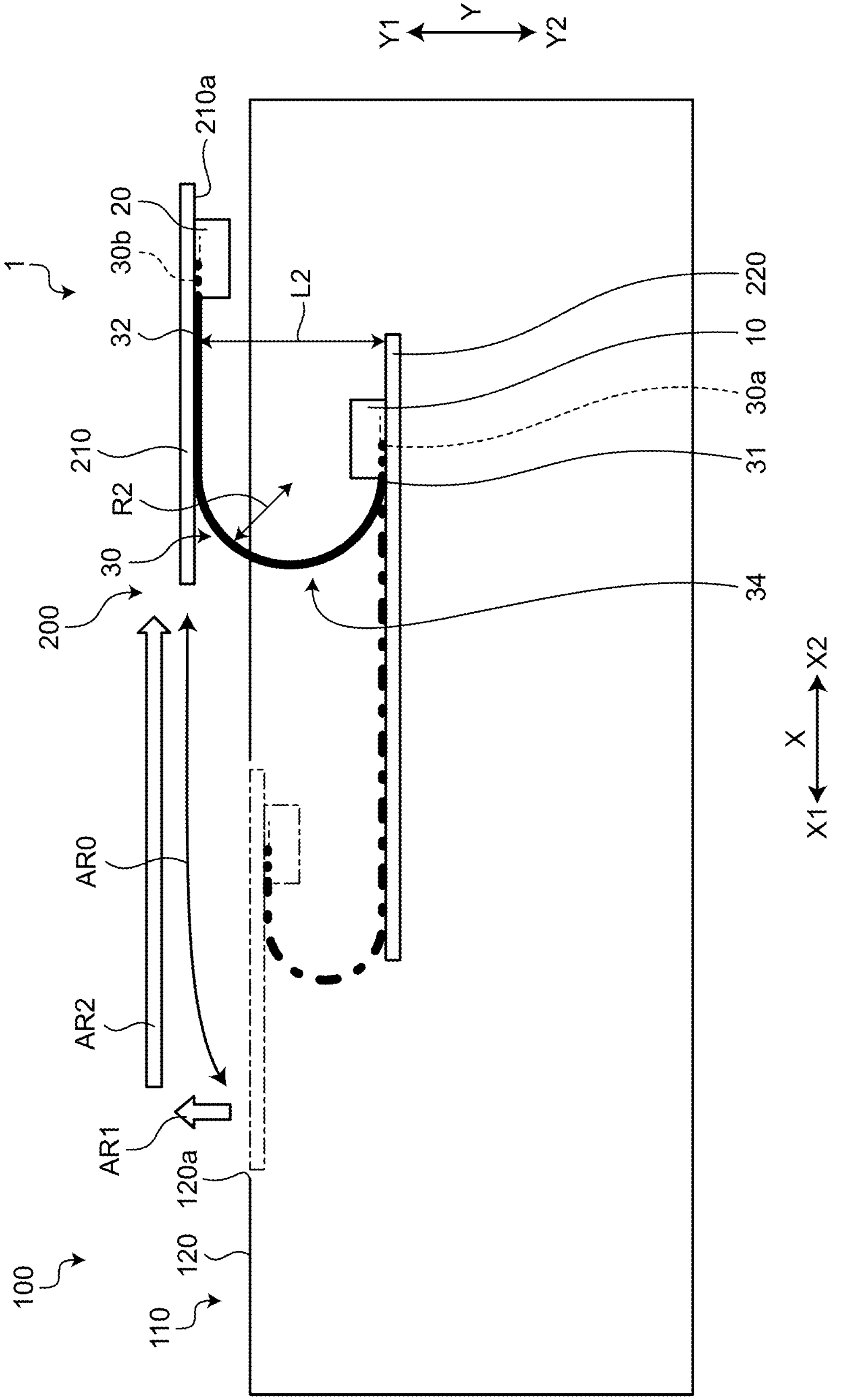
FIG. 2 is a side view of the routing structure according to the embodiment.
Figure 3:
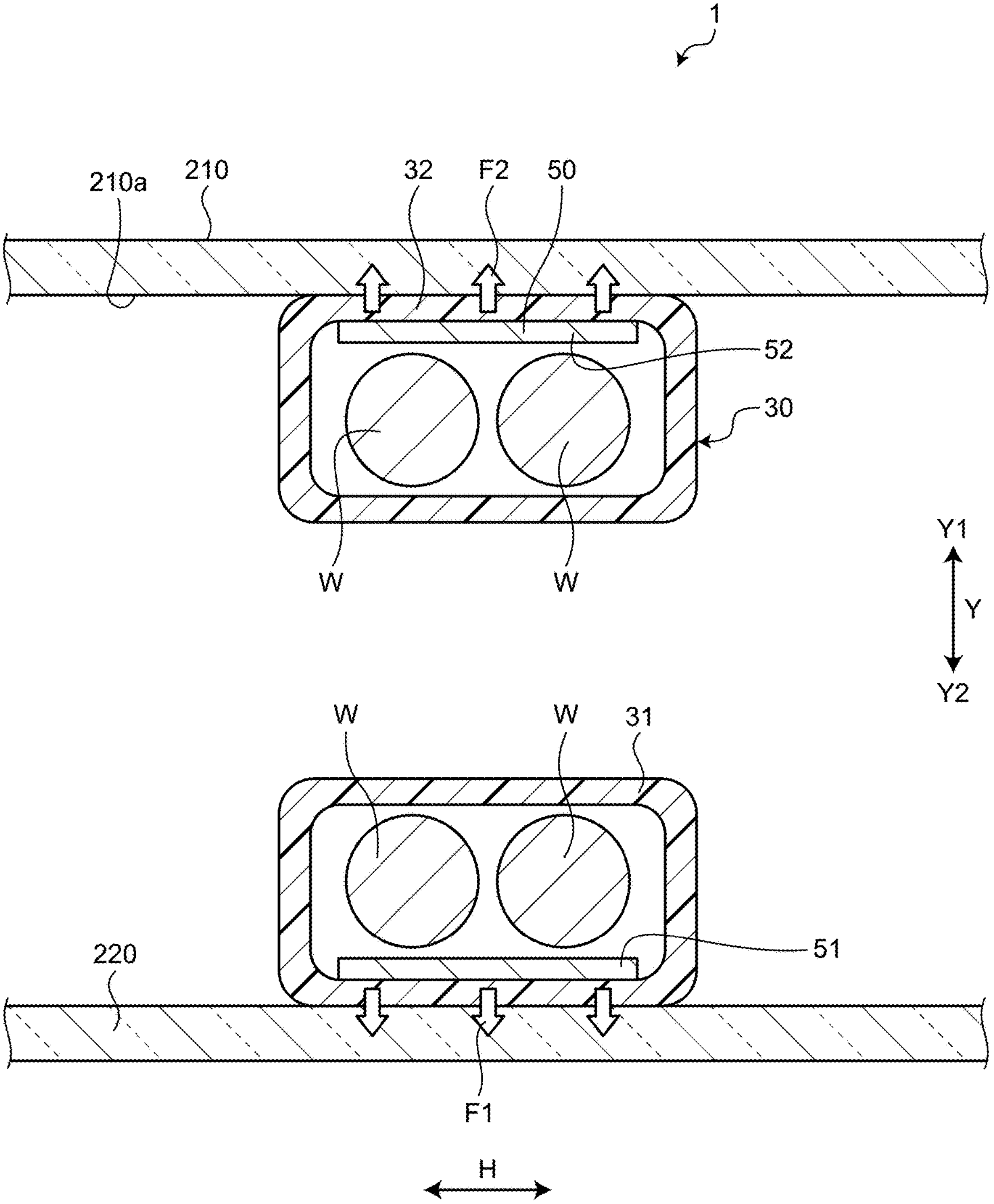
FIG. 3 is a cross-sectional view of the routing structure according to the embodiment.
Figure 4:
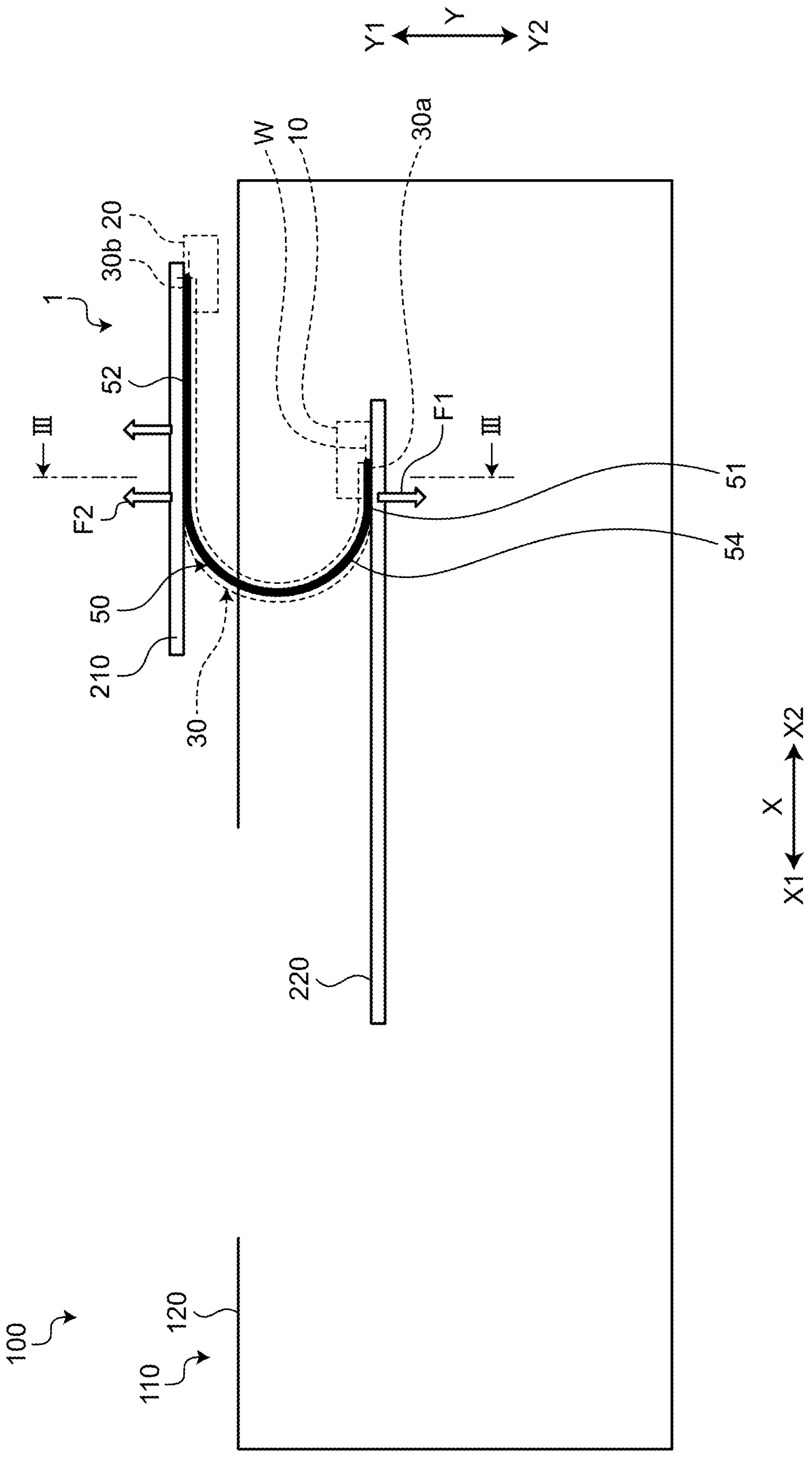
FIG. 4 is a side view of the routing structure according to the embodiment.
Figure 5:
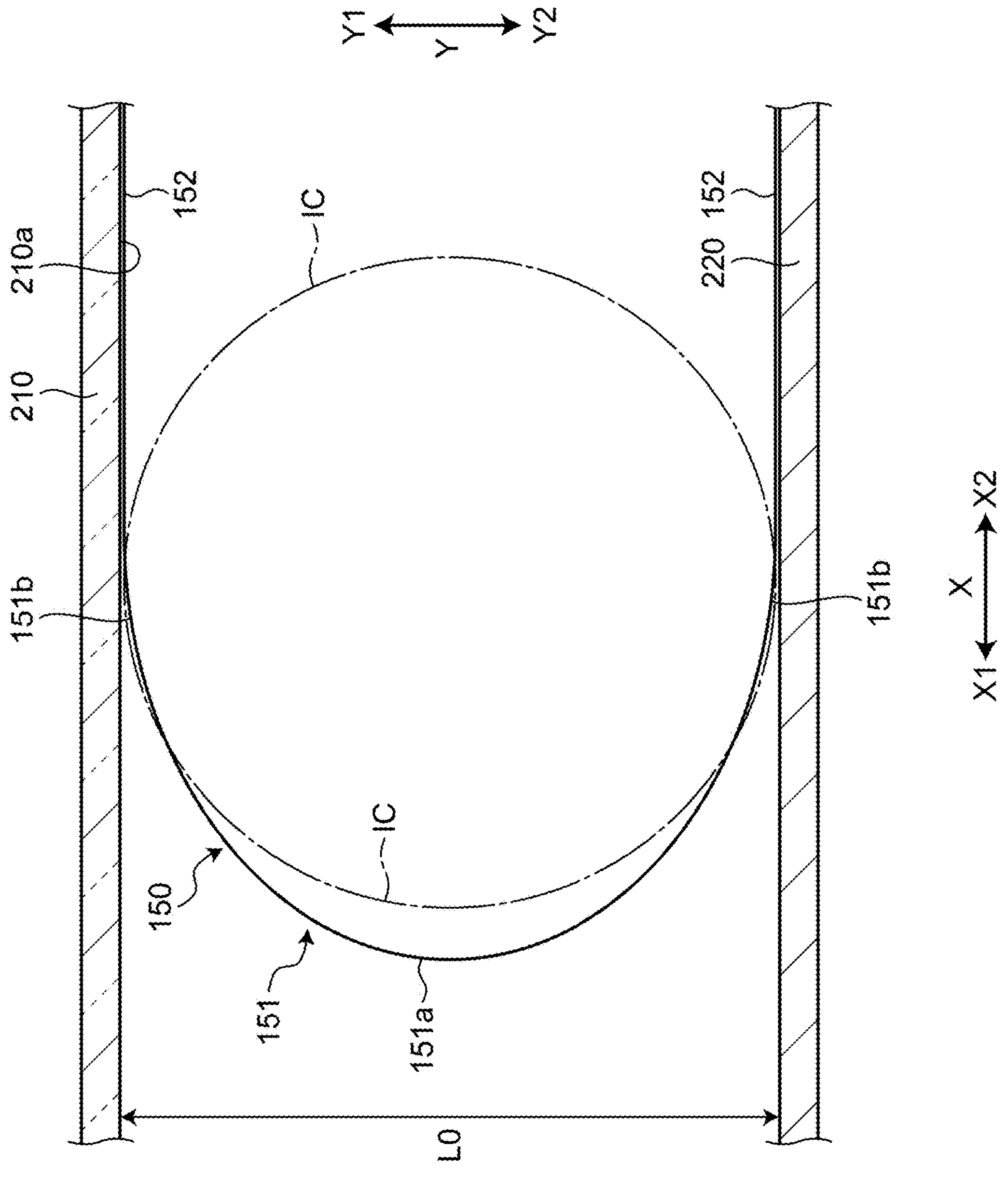
FIG. 5 is a view for explaining a tapered shape.
Figure 6:
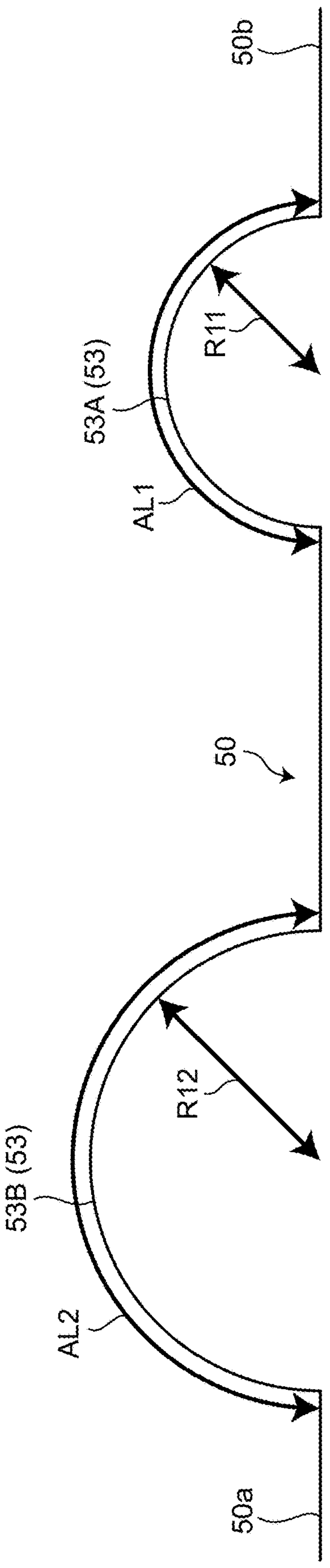
FIG. 6 is a side view of a biasing member according to the embodiment.
Figure 7:
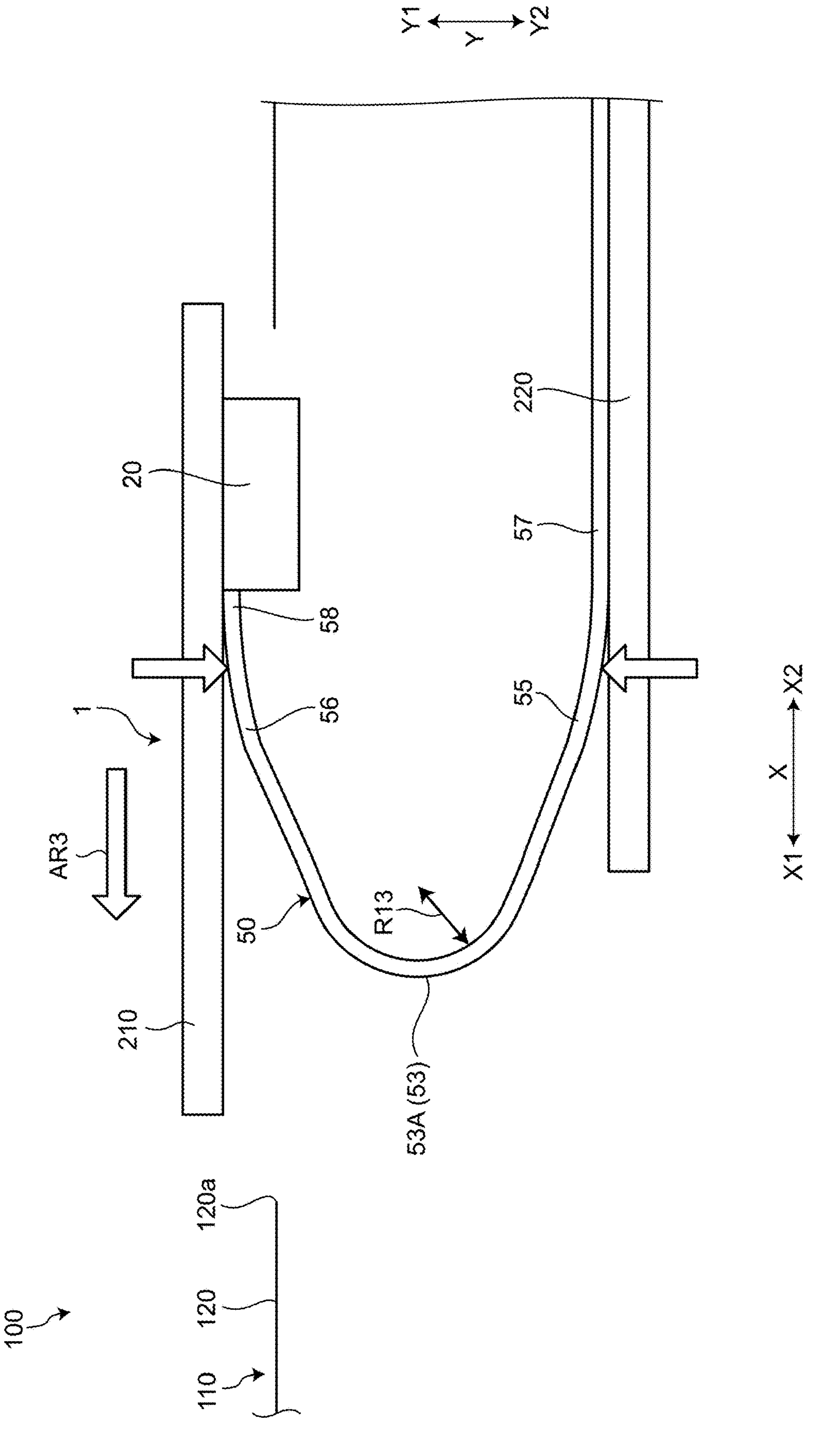
FIG. 7 is a side view of the biasing member when a slide body is at a half opened position.
Figure 8:
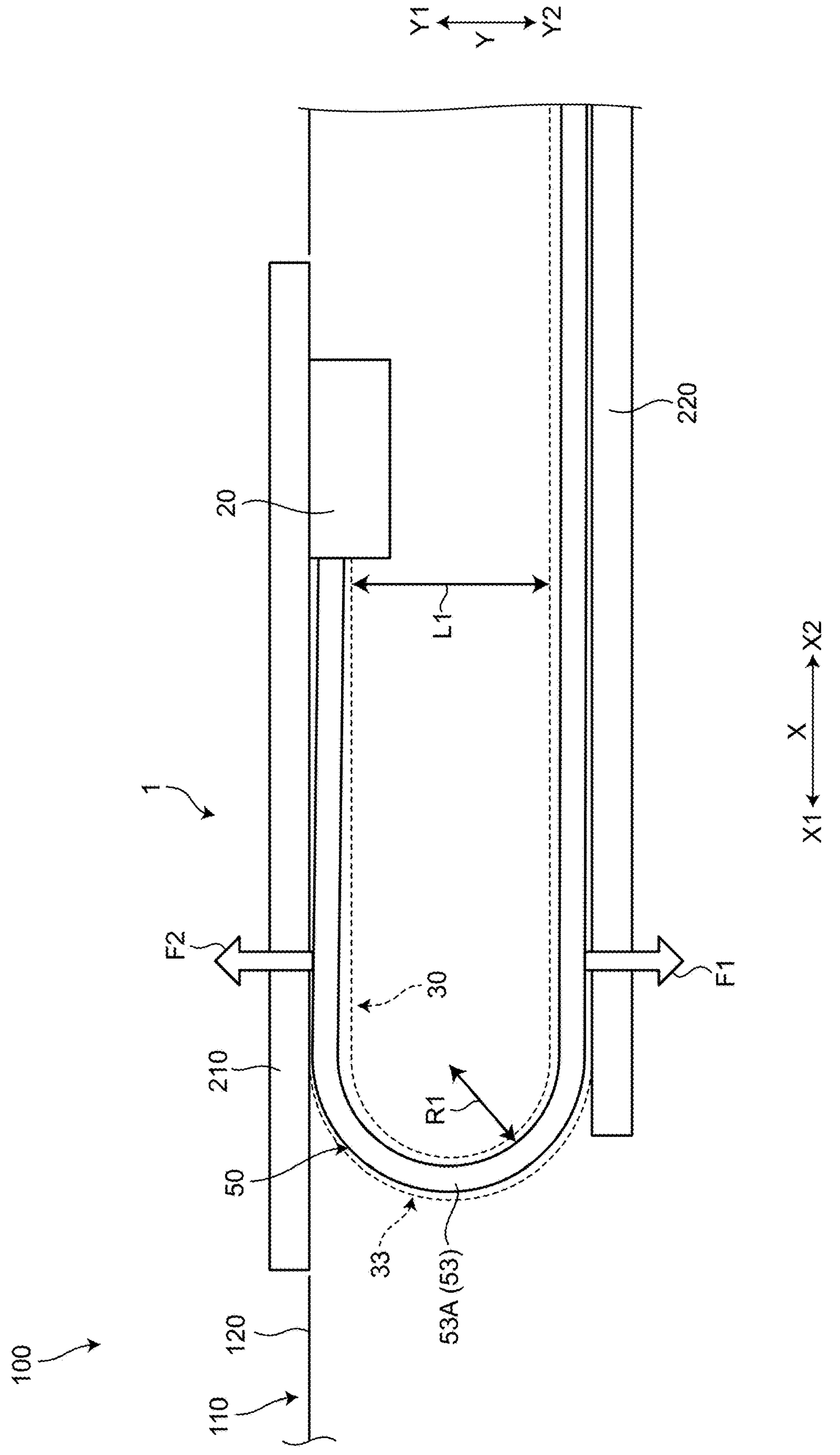
FIG. 8 is a side view of the biasing member when the slide body is at a fully closed position.
Figure 9:
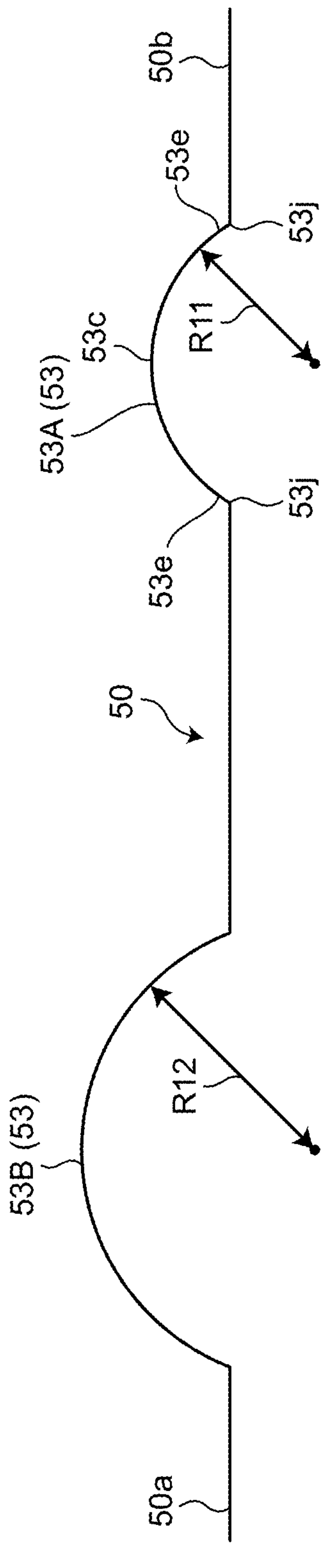
FIG. 9 is a side view illustrating an example of the biasing member according to the embodiment.
Figure 10:
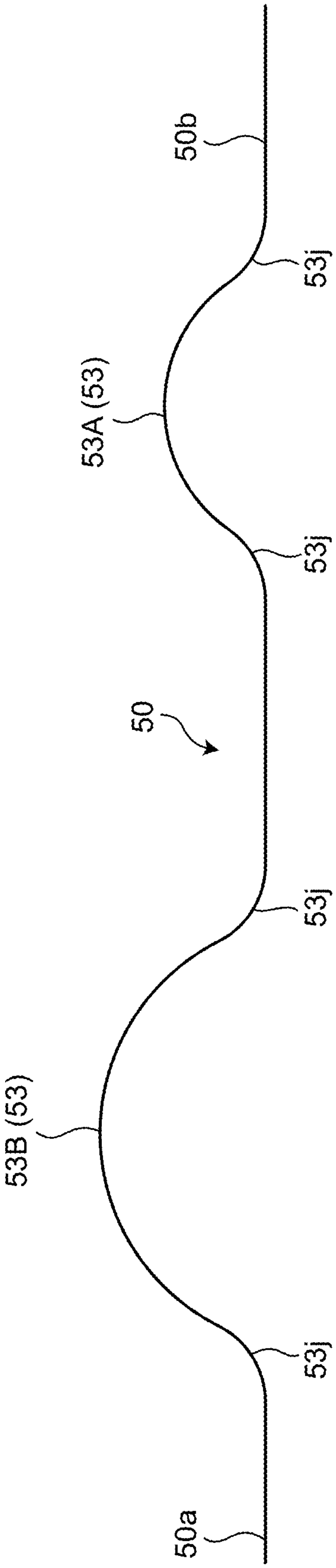
FIG. 10 is a side view illustrating an example of the biasing member according to the embodiment.

An embodiment will be described with reference to FIGS. 1 to 10. The present embodiment relates to a routing structure. FIGS. 1 and 2 are side views of the routing structure according to the embodiment, FIG. 3 is a cross-sectional view of the routing structure according to the embodiment, FIG. 4 is a side view of the routing structure according to the embodiment, FIG. 5 is a view for explaining a tapered shape, FIG. 6 is a side view of a biasing member according to the embodiment, FIG. 7 is a side view of the biasing member when a slide body is at a half opened position, FIG. 8 is a side view of the biasing member when the slide body is at a fully closed position, and FIGS. 9 and 10 are side views illustrating examples of the biasing member according to the embodiment. FIG. 3 illustrates a cross section taken along line III-III in FIG. 4.

As illustrated in FIG. 1, a routing structure 1 according to the embodiment is applied to a sunroof 200 of a vehicle 100. The vehicle 100 is, for example, an automobile on which a power source such as a motor or an engine is mounted. The vehicle 100 includes a vehicle body 110. The vehicle body 110 has a roof 120 that covers the vehicle interior. The roof 120 has an opening 120*a* that is open upward.

The vehicle 100 includes a sunroof 200 that opens and closes the opening 120*a*. The sunroof 200 has a slide body 210, a rail 220, and a routing structure 1. The slide body 210 is a member that slides along a vehicle front-rear direction X with respect to the opening 120*a*. The slide body 210 according to the present embodiment is a plate-like member that closes the opening 120*a* or opens the opening 120*a*. The slide body 210 may be glass configured to allow light to be transmitted therethrough.

The sunroof 200 includes a mechanism such as a link mechanism that moves the slide body 210 along a predetermined path, and a drive source such as a motor that operates the above mechanism. The sunroof 200 moves the slide body 210 between a fully closed position where the opening 120*a* is closed and a fully opened position where the opening 120*a* is opened. FIG. 1 illustrates the slide body 210 at the fully closed position. FIG. 2 illustrates the slide body 210 at the fully opened position.

The rail 220 is fixed to the vehicle body 110. The rail 220 extends in the vehicle front-rear direction X. The rail 220 supports the mechanism for moving the slide body 210, and guides the mechanism in the vehicle front-rear direction X. The rail 220 further supports an exterior member 30, and forms a first extending portion 31 on the exterior member 30.

The sunroof 200 according to the present embodiment moves the slide body 210 along a path AR0 illustrated in FIG. 2. The movement of the slide body 210 along the path AR0 includes a movement along the vehicle front-rear direction X and a movement along a vehicle up-down direction Y. When the slide body 210 moves from the fully closed position toward the fully opened position, the slide body 210 moves toward an upper side Y1 in the vehicle up-down direction Y and moves toward a rear side X2 in the vehicle front-rear direction X as indicated by an arrow AR1 in FIG. 2.

Conversely, when the slide body 210 moves from the fully opened position to the fully closed position, the slide body 210 moves toward a front side X1 in the vehicle front-rear direction X and moves toward a lower side Y2 in the vehicle up-down direction Y.

As illustrated in FIGS. 1 to 3, the routing structure 1 includes a first fixing part 10, a second fixing part 20, an exterior member 30, an electric wire W, and a biasing member 50. The exterior member 30 and the electric wire W constitute a wire harness routed between the vehicle body 110 and the slide body 210.

The first fixing part 10 is a member fixed to the vehicle body 110 of the vehicle 100. The first fixing part 10 may be a protector that protects the electric wire W. The first fixing part 10 is formed of, for example, an insulating synthetic resin. The first fixing part 10 has a space in which the electric wire W is routed and has a holding structure for holding the exterior member 30.

The second fixing part 20 is a member fixed to the slide body 210 of the sunroof 200. The second fixing part 20 may be a protector that protects the electric wire W. The second fixing part 20 is formed of, for example, an insulating synthetic resin. The second fixing part 20 has a space in which the electric wire W is routed and has a holding structure for holding the exterior member 30.

The exterior member 30 is an elastically deformable tubular member. The exterior member 30 is, for example, a member called a corrugated tube. The exterior member 30 is formed of, for example, an insulating synthetic resin. The exterior member 30 may have a bellows shape.

The exterior member 30 has a first end portion 30*a* held by the first fixing part 10 and a second end portion 30*b* held by the second fixing part 20. The first fixing part 10 holds the first end portion 30*a* such that the exterior member 30 extends from the first fixing part 10 along the rail 220 in the vehicle front-rear direction X. The first fixing part 10 according to the present embodiment holds the first end portion 30*a* such that the exterior member 30 extends from the first fixing part 10 toward the front side X1.

The second fixing part 20 holds the second end portion 30*b* such that the exterior member 30 extends from the second fixing part 20 along the slide body 210 in the vehicle front-rear direction X. The second fixing part 20 according to the present embodiment holds the second end portion 30*b* such that the exterior member 30 extends from the second fixing part 20 toward the front side X1.

The electric wire W and the biasing member 50 are inserted through the exterior member 30. The electric wire W is, for example, a sheathed electric wire having a stranded wire and a sheath. The electric wire W may be a flat routing material, a printed circuit body, or another circuit body. The electric wire W drawn out from the first end portion 30*a* is connected to a power supply and a control device disposed in the vehicle body 110. The electric wire W drawn out from the second end portion 30*b* is connected to a load disposed on the slide body 210. The load disposed on the slide body 210 may be, for example, a lighting device, a light control film disposed on the glass of the slide body 210, or another electric load.

As illustrated in FIGS. 1 and 2, the exterior member 30 has a curved portion 33 or 34 that is curved in the vehicle front-rear direction X between the first end portion 30*a* and the second end portion 30*b*. The curved portion 33 or 34 is formed by the biasing member 50. The curved portion 33 illustrated in FIG. 1 is a curved portion formed in the exterior member 30 in a state where the slide body 210 is at the fully closed position. The curved portion 33 has a radius R1. The curved portion 34 illustrated in FIG. 2 is a curved portion formed in the exterior member 30 in a state where the slide body 210 is at the fully opened position. The curved portion 34 has a radius R2. The electric wire W in which the curved portion 33 or 34 is formed has a U shape or a J shape.

As illustrated in FIG. 1, when the slide body 210 is at the fully closed position, a distance of the second end portion 30*b* from the first end portion 30*a* in the vehicle up-down direction Y is a first distance L1. The radius R1 of the curved portion 33 is half the first distance L1.

As illustrated in FIG. 2, when the slide body 210 is at the fully opened position, a distance of the second end portion 30*b* from the first end portion 30*a* in the vehicle up-down direction Y is a second distance L2. The radius R2 of the curved portion 34 is half the second distance L2.

In the sunroof 200 according to the present embodiment, the second distance L2 at the fully opened position is larger than the first distance L1 at the fully closed position. Accordingly, the radius R1 of the curved portion 33 when the slide body 210 is at the fully closed position is smaller than the radius R2 of the curved portion 34 when the slide body 210 is at the fully opened position. In addition, the radius R1 when the slide body 210 is at the fully closed position is smaller than a radius of a curved shape formed in the biasing member 50 when the slide body 210 is at another position. In other words, the curved shape formed in the biasing member 50 has a smallest radius when the slide body 210 is at the fully closed position.

The second end portion 30*b* of the exterior member 30 moves together with the slide body 210. At this time, the exterior member 30 follows the movement of the second fixing part 20 while gradually changing the position where the curved shape is formed.

The biasing member 50 according to the present embodiment is a member that presses the exterior member 30 toward the slide body 210. The biasing member 50 according to the present embodiment is a rod-like or plate-like member, and is elastically deformable. The biasing member 50 is formed of, for example, a metal or a resin.

As illustrated in FIG. 3, the exterior member 30 according to the present embodiment has a rectangular cross-sectional shape. The exemplified cross-sectional shape of the biasing member 50 is rectangular. That is, the exemplified biasing member 50 is a plate-like member. The biasing member 50 in FIG. 3 is disposed outside the electric wire W. Therefore, in the curved portion 33 or 34, the biasing member 50 is positioned outside the electric wire W in a radial direction. As illustrated in FIG. 3, the biasing member 50 applies pressing forces F1 and F2 to the exterior member 30.

As illustrated in FIG. 4, the exterior member 30, the electric wire W, and the biasing member 50 are routed in a curved state in a U shape or a J shape. That is, the biasing member 50 extends from the first fixing part 10 to the second fixing part 20 with a curved portion 54.

The biasing member 50 bent to have the curved portion 54 forms the curved portion 33 or 34 in the exterior member 30, and applies the pressing force F1 and the pressing force F2 to the exterior member 30. The pressing force F1 is a force in the vehicle up-down direction Y, and presses the exterior member 30 toward the rail 220. The pressing force F2 is a force in the vehicle up-down direction Y, and presses the exterior member 30 toward the slide body 210. The pressing forces F1 and F2 are restoring forces generated in the bent biasing member 50.

The pressing force F1 forms a first extending portion 31 in the exterior member 30. The pressing force F2 forms a second extending portion 32 in the exterior member 30. As illustrated in FIG. 2, etc., the second extending portion 32 is a portion extending along a vehicle interior side surface 210*a* of the slide body 210. The vehicle interior side surface 210*a* is a surface facing the lower side Y2. When the vehicle interior side surface 210*a* is a flat surface, the second extending portion 32 is formed straight. When the vehicle interior side surface 210*a* has a curved shape, the second extending portion 32 has a curved shape along the vehicle interior side surface 210*a*.

The biasing member 50 according to the present embodiment is configured to press the exterior member 30 toward the slide body 210 both when the slide body 210 is at the fully closed position and when the slide body 210 is at the fully opened position. In other words, the biasing member 50 has rigidity capable of pressing the exterior member 30 against and in contact with the slide body 210 at all times. Therefore, the routing structure 1 according to the present embodiment can stabilize the shape of the exterior member 30. The biasing member 50 can keep the exterior member 30 in contact with the slide body 210 against an external force such as a vibration generated, for example, during traveling.

As will be described below, the routing structure 1 according to the present embodiment can suppress the biasing member 50 from having a tapered shape in the curved portion 33 or 34. FIG. 5 illustrates a tapered shape formed in a biasing member 150 according to a comparative example. The biasing member 150 according to the comparative example is a rod-like or flat plate-like member. The biasing member 150 is disposed between the slide body 210 and the rail 220 by bending the straight member. By sandwiching the biasing member 150 between the slide body 210 and the rail 220, a curved portion 151 and a straight portion 152 are formed in the biasing member 150. The straight portions 152 are portions extending straight, and are formed along the slide body 210 and the rail 220, respectively.

The curved portion 151 has a leading end portion 151*a* and two tail end portions 151*b*. The leading end portion 151*a* is a central portion of the curved portion 151, and has a convex shape in the vehicle front-rear direction X. The tail end portions 151*b* are end portions of the curved portion 151 in the vehicle up-down direction Y, and are portions connected to the straight portions 152. The curved portion 151 has a tapered shape. More specifically, the shape of the curved portion 151 is a shape in which the bending radius decreases from the tail end portion 151*b* toward the leading end portion 151*a*.

FIG. 5 illustrates a virtual circle IC. The virtual circle IC is a circle whose diameter is a distance L0 in the vehicle up-down direction Y from the rail 220 to the slide body 210. The bending radius of the leading end portion 151*a* is smaller than the radius of the virtual circle IC. In the curved portion 151 having a tapered shape, the leading end portion 151*a* has a smaller bending radius than the tail end portion 151*b*. In a case where the straight biasing member 150 is folded back by 180 degrees, a deviation in bending radius occurs in the curved portion 151 that is greatly deformed, and such a tapered shape is easily formed.

As illustrated in FIG. 6, the biasing member 50 according to the present embodiment has an arcuate portion 53. The arcuate portion 53 is a portion that forms the curved portion 33 or 34 in the exterior member 30. The exemplified biasing member 50 includes a first arcuate portion 53A and a second arcuate portion 53B as the arcuate portion 53. The first arcuate portion 53A is a portion that forms the curved portion 33 when the slide body 210 is at the fully closed position. The second arcuate portion 53B is a portion that forms the curved portion 34 when the slide body 210 is at the fully opened position.

The biasing member 50 has a first end portion 50*a* and a second end portion 50*b*. The first end portion 50*a* is an end portion corresponding to the first end portion 30*a* of the exterior member 30, and is inserted into the first fixing part 10. The second end portion 50*b* is an end portion corresponding to the second end portion 30*b* of the exterior member 30, and is inserted into the second fixing part 20. The first arcuate portion 53A is disposed closer to the second end portion 50*b* than the second arcuate portion 53B.

The arcuate portion 53 is formed to have an arcuate shape with a predetermined radius in a state where no external force acts on the biasing member 50. The state in which no external force acts on the biasing member 50 is, for example, a state in which no bending moment acts on the biasing member 50.

In a case where the biasing member 50 is made of a metal, the arcuate portion 53 is formed, for example, by bending the metal rod or the metal plate. In a case where the biasing member 50 is made of a resin, the arcuate portion 53 is formed, for example, by injection molding.

In the biasing member 50, the portion other than the arcuate portion 53 is formed, for example, in a straight shape. The first arcuate portion 53A is formed to have an arcuate shape with a radius R11 with no external force applied thereto. The second arcuate portion 53B is formed to have an arcuate shape with a radius R12 with no external force applied thereto.

The radius R11 of the first arcuate portion 53A is greater than the radius R1 of the curved portion 33, and the radius R12 of the second arcuate portion 53B is greater than the radius R2 of the curved portion 34. That is, the radius R11 of the first arcuate portion 53A is greater than half of the first distance L1, and the radius R12 of the second arcuate portion 53B is greater than half of the second distance L2.

As will be described below, the arcuate portion 53 is deformed such that the bending radius decreases when the curved portion 33 or 34 is formed. For example, as will be described below, the first arcuate portion 53A has a bending radius that decreases when the curved portion 33 is formed.

In FIG. 7, the biasing member 50 when the slide body 210 is at a half opened position is illustrated. FIG. 7 is a view for explaining the shape of the biasing member 50, in which the exterior member 30 is omitted. As indicated by an arrow AR3, the slide body 210 moves toward the front side X1 in the vehicle front-rear direction X toward the fully closed position. In the biasing member 50 illustrated in FIG. 7, the first arcuate portion 53A protrudes toward the front side X1 in the vehicle front-rear direction X.

The biasing member 50 is pressed in the vehicle up-down direction Y by the slide body 210 and the rail 220. In other words, a bending moment acts on the biasing member 50 due to the force received from the slide body 210 and the rail 220. At this time, a radius R13 of the first arcuate portion 53A is smaller than the radius R11 when no external force is applied, and is greater than the radius R1 of the curved portion 33 in the fully closed state. In the biasing member 50, curved portions 55 and 56 adjacent to the first arcuate portion 53A are formed. The curved portion 55 is formed between one end of the first arcuate portion 53A and a straight portion 57 that extends along the rail 220. The curved portion 56 is formed between the other end of the first arcuate portion 53A and a straight portion 58 that extends along the slide body 210.

In FIG. 8, the biasing member 50 when the slide body 210 reaches the fully closed position is illustrated. The distance between the slide body 210 and the rail 220 is smaller than the distance in the state of FIG. 7. At this time, the bending radius of the first arcuate portion 53A is equal to the radius R1 of the curved portion 33 in the fully closed state. The biasing member 50 forms the curved portion 33 in the exterior member 30 by the first arcuate portion 53A. The bending radius R1 of the first arcuate portion 53A is smaller than the radius R11 in a no-load state where no bending moment acts. Therefore, the biasing member 50 can apply the pressing forces F1 and F2 to the exterior member 30.

In the routing structure 1 according to the present embodiment, the first arcuate portion 53A forming the curved portion 33 is formed in an arcuate shape in advance. The amount of deformation when the first arcuate portion 53A is deformed into a curved shape with the radius R1 is smaller than the amount of deformation when the straight member is deformed into a curved shape with the radius R1. That is, the stress of the first arcuate portion 53A when the first arcuate portion 53A has a curved shape with the radius R1 is smaller than the stress when the straight member is deformed into a curved shape with the radius R1. Since the amount of deformation of the first arcuate portion 53A from the no-load state in which no bending moment acts is suppressed, a tapered shape is hardly generated in the first arcuate portion 53A. In addition, since stress generated in the first arcuate portion 53A when the curved portion 33 is formed is suppressed, a tapered shape is hardly generated in the first arcuate portion 53A.

An arc length AL1 of the first arcuate portion 53A illustrated in FIG. 6 is determined, for example, based on the radius R1 of the curved portion 33 in the fully closed state. A length of a circumference of a circle having a radius R1 is defined as C1. In this case, the arc length AL1 is determined, for example, to satisfy Expression (1). In other words, the arc length AL1 is set to be equal to or greater than a length of a semicircle having a radius R1. As a result, stress concentration hardly occurs in a portion of the biasing member 50 that forms the curved portion 33, suppressing a tapered shape.

$$AL1 \geq C1/2 \quad (1)$$

In the routing structure 1 according to the present embodiment, the second arcuate portion 53B forming the curved portion 34 is formed in an arcuate shape in advance. The amount of deformation when the second arcuate portion 53B is deformed into a curved shape with the radius R2 is smaller than the amount of deformation when the straight member is deformed into a curved shape with the radius R2. Since the amount of deformation of the second arcuate portion 53B from the no-load state in which no bending moment acts is suppressed, a tapered shape is hardly generated in the second arcuate portion 53B. In addition, since stress generated in the second arcuate portion 53B when the curved portion 34 is formed is suppressed, a tapered shape is hardly generated in the second arcuate portion 53B.

An arc length AL2 of the second arcuate portion 53B illustrated in FIG. 6 is determined, for example, based on the radius R2 of the curved portion 34 in the fully opened state. A length of a circumference of a circle having a radius R2 is defined as C2. In this case, the arc length AL2 is determined, for example, to satisfy Expression (2). In other words, the arc length AL2 is set to be equal to or greater than a length of a semicircle having a radius R2. As a result, stress concentration hardly occurs in a portion of the biasing member 50 that forms the curved portion 34, suppressing a tapered shape.

$$AL2 \geq C2/2 \quad (2)$$

As described above, the routing structure 1 according to the present embodiment includes a first fixing part 10, a second fixing part 20, an exterior member 30, an electric wire W, and a rod-like or plate-like biasing member 50. The first fixing part 10 is fixed to a vehicle body 110 of a vehicle 100. The second fixing part 20 is fixed to a slide body 210. The slide body 210 moves along a vehicle front-rear direction X with respect to an opening 120*a* provided in a roof 120 of the vehicle body 110. The exterior member 30 has a first end portion 30*a* held by the first fixing part 10 and a second end portion 30*b* held by the second fixing part 20. The electric wire W and the biasing member 50 are inserted through the exterior member 30.

The biasing member 50 forms a curved portion 33 or 34 curved in the vehicle front-rear direction X between the first end portion 30*a* and the second end portion 30*b* of the exterior member 30. The biasing member 50 has an arcuate portion 53. The arcuate portion 53 is a portion that forms the curved portion 33 or 34 when the slide body 210 is located at an end of a slide range. In the present embodiment, the end of the slide range is a fully closed position or a fully opened position of the slide body 210.

The arcuate portion 53 is formed to have an arcuate shape with a predetermined radius R11 or R12 in a state where no external force acts on the biasing member 50. The predetermined radius R11 or R12 is greater than half of a distance L1 or L2 in the vehicle up-down direction Y from the first end portion 30*a* to the second end portion 30*b* when the slide body 210 is located at the end of the slide range. For example, the radius R11 of the first arcuate portion 53A is greater than half of the first distance L1 when the slide body 210 is at the fully closed position. In the routing structure 1 according to the present embodiment, since the arcuate portion 53 is formed in an arcuate shape in advance, the biasing member 50 is suppressed from having a tapered shape in the curved portion 33 or 34.

In the slide range of the slide body 210 according to the present embodiment, one end is a fully closed position, and the other end is a fully opened position. The fully closed position is a position where the slide body 210 closes the opening 120*a*, and the fully opened position is a position where the slide body 210 opens the opening 120*a*. The biasing member 50 includes a first arcuate portion 53A and a second arcuate portion 53B as the arcuate portion 53.

The first arcuate portion 53A forms the curved portion 33 when the slide body 210 is at the fully closed position. The second arcuate portion 53B forms the curved portion 34 when the slide body 210 is at the fully opened position. The routing structure 1 according to the present embodiment can suppress the biasing member 50 from having a tapered shape both when the slide body 210 is at the fully closed position and when the slide body 210 is at the fully opened position.

The shape of the arcuate portion 53 in the no-load state is not limited to the shape illustrated in FIG. 6. For example, as illustrated in FIG. 9, the central angle of the arcuate portion 53 may be smaller than 180 degrees. The central angle of the arcuate portion 53 may be, for example, 90 degrees, 120 degrees, 150 degrees, or another angle.

In the biasing member 50, the shape of the arcuate portion 53 may include a portion having a different bending radius. For example, in the first arcuate portion 53A, a central portion 53*c* of the first arcuate portion 53A may have a greater bending radius than both end portions 53*e* of the first arcuate portion 53A. In this case, the central portion 53*c* has a relatively flat shape as compared with both end portions 53*e*.

As illustrated in FIG. 10, in the arcuate portion 53, a curved shape may be provided in a connection portion 53*j* connected to a straight portion. The direction of curvature of the connection portion 53*j* is opposite to the direction of curvature of the arcuate portion 53. That is, in the arcuate portion 53 illustrated in FIG. 10, the connection portion 53*j* is curved to form an inflection point.

The biasing member 50 may be a rod-like member having a circular cross-sectional shape. The biasing member 50 may be a rod-like member having a polygonal cross-sectional shape. The exterior member 30 is not limited to a so-called corrugated tube. The exterior member 30 may be a braided tube or another member used as an exterior member. The biasing member 50 may be disposed inside the electric wire W. That is, the biasing member 50 may be disposed inside the electric wire W in the radial direction in the curved portion 33 or 34.

The embodiments disclosed above can be carried out in an appropriate combination.

The biasing member of the routing structure according to the present embodiment has an arcuate portion that is a portion forming the curved portion when the slide body is located at the end of the slide range. The arcuate portion is formed to have an arcuate shape with a predetermined radius in a state where no external force acts on the biasing member. The routing structure according to the present embodiment is capable of suppressing the biasing member from having a tapered shape.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A routing structure comprising:

a first fixing part fixed to a vehicle body of a vehicle;

a second fixing part fixed to a slide body that moves along a vehicle front-rear direction with respect to an opening provided in a roof of the vehicle body;

an exterior member having a first end portion held by the first fixing part and a second end portion held by the second fixing part;

an electric wire inserted through the exterior member; and a rod-like or plate-like biasing member inserted through the exterior member and forming a curved portion curved in the vehicle front-rear direction between the first end portion and the second end portion of the exterior member, wherein the biasing member has an arcuate portion that is a portion forming the curved portion when the slide body is located at an end of a slide range, the arcuate portion is formed to have an arcuate shape with a predetermined radius in a state where no external force acts on the biasing member, and the predetermined radius is greater than half of a distance from the first end portion to the second end portion in a vehicle up-down direction when the slide body is located at the end portion of the slide range.

2. The routing structure according to claim 1, wherein in the slide range of the slide body, one end is a fully closed position where the slide body closes the opening, and the other end is a fully opened position where the slide body opens the opening, the biasing member has a first arcuate portion and a second arcuate portion as the arcuate portion, the first arcuate portion forms the curved portion when the slide body is at the fully closed position, and the second arcuate portion forms the curved portion when the slide body is at the fully opened position.

* * * * *